United States Patent [19]

Miyaoh et al.

[11] Patent Number: 5,700,016
[45] Date of Patent: Dec. 23, 1997

[54] METAL LAMINATE GASKET WITH SURFACE PRESSURE ADJUSTMENT MECHANISM

[75] Inventors: Yoshio Miyaoh, Tokyo; Susumu Inamura, Utsunomiya, both of Japan

[73] Assignee: Ishikawa Gasket Co., Ltd., Tokyo, Japan

[21] Appl. No.: 652,030

[22] Filed: May 21, 1996

[30] Foreign Application Priority Data

May 31, 1995 [JP] Japan ................................ 7-133620
May 31, 1995 [JP] Japan ................................ 7-133621

[51] Int. Cl.⁶ ................................................ F16J 15/08
[52] U.S. Cl. ........................................................ 277/235 B
[58] Field of Search .................................... 277/180, 233, 277/235 A, 235 B

[56] References Cited

U.S. PATENT DOCUMENTS

| | | |
|---|---|---|
| 4,834,399 | 5/1989 | Udagawa et al. . |
| 4,896,891 | 1/1990 | Udagawa ................ 277/235 B |
| 4,898,396 | 2/1990 | Udagawa ................ 277/235 B |
| 4,995,624 | 2/1991 | Udagawa et al. . |
| 5,058,908 | 10/1991 | Udagawa ................ 277/235 B |
| 5,076,595 | 12/1991 | Udagawa ................ 277/235 B |
| 5,211,408 | 5/1993 | Udagawa . |
| 5,213,345 | 5/1993 | Udagawa ................ 277/235 B |
| 5,221,097 | 6/1993 | Ishikawa et al. ........ 277/235 B |
| 5,226,663 | 7/1993 | Miyaoh ................... 277/235 B |
| 5,240,261 | 8/1993 | Udagawa et al. ....... 277/235 B |
| 5,294,135 | 3/1994 | Kubouchi et al. ...... 277/235 B |
| 5,310,196 | 5/1994 | Kawaguchi et al. ........ 277/180 |
| 5,408,963 | 4/1995 | Miyaoh et al. ......... 277/235 B |
| 5,435,575 | 7/1995 | Udagawa .................... 277/180 |
| 5,460,387 | 10/1995 | Miyaoh et al. ............. 277/180 |
| 5,522,604 | 6/1996 | Weiss et al. ................ 277/180 |
| 5,549,307 | 8/1996 | Capretta et al. ........ 277/235 B |
| 5,560,623 | 10/1996 | Yoshino .................. 277/235 B |

FOREIGN PATENT DOCUMENTS 0 580 427  1/1994  European Pat. Off. .

*Primary Examiner*—Scott Cummings
*Attorney, Agent, or Firm*—Kanesaka & Takeuchi

[57] ABSTRACT

A metal laminate gasket of the invention is used for an internal combustion engine. The gasket is formed of first and second metal plates extending substantially throughout an entire area of the gasket. The first plate includes a main portion, a curved portion for defining a first hole, and a flange extending from the curved portion. The second plate is situated under the main portion of the first plate, and includes a second hole in which the curved portion is located, an inner portion situated around the second hole and disposed on the flange, and a recess formed in the inner portion around the second hole to form a thin portion. At least one bead is formed on at least one of the first and second metal plates to surround the hole of the engine to seal the same. The surface pressure of the gasket around the hole can be adjusted by regulating the thickness of the thin portion.

10 Claims, 2 Drawing Sheets

METAL LAMINATE GASKET WITH SURFACE PRESSURE ADJUSTMENT MECHANISM

BACKGROUND OF THE INVENTION AND RELATED ART STATEMENT

The present invention relates to a metal laminate gasket with a surface pressure adjustment mechanism around a hole to be sealed, wherein the thickness of the plate for the gasket is adjusted while a bead is utilized.

An automobile engine has been developed to provide light weight and high power, while the engine lasts long without serious trouble. In view of these requirements, a gasket to be installed in the engine must have light weight and seal properly around cylinder bores and fluid holes.

In view of these requirements, gaskets formed of two plates were proposed, for example U.S. Pat. Nos. 4,823,399 and No. 4,995,624 and Japanese Utility Model Publication (KOKOKU) No. 3-22539.

As shown in FIG. 5, a gasket as disclosed in U.S. Pat. No. 4,823,399 is formed of an upper plate 10 having a hole 11 for a cylinder bore and a hole 12 for a water hole, a lower plate 13 having a hole 14 for the cylinder bore and a hole 15 for the water hole, and coating layers 16 formed on both sides of the lower plate 13. The upper plate 10 includes a curved portion 10a and a flange 10b, which seal around the hole 11, while the lower plate 13 includes a bead 13a formed around the hole 15 and located inside the hole 12. In this gasket, when surface pressures around the cylinder bore or the water hole are changed, it is required to change a size of the curved portion 10a or the bead 13a, or the thickness of the plates 10 or 13.

In U.S. Pat. No. 4,995,624, although a wide surface pressure is formed around a cylinder bore by an embossed portion with a bead, the surface pressure around the cylinder bore is not easily regulated.

In view of the foregoings, the present invention has been made.

An object of the invention is to provide a metal laminate gasket, which can securely seal around a hole.

Another object of the invention is to provide a metal laminate gasket as stated above, wherein the surface pressure around the hole can be easily adjusted.

A further object of the invention is to provide a metal laminate gasket as stated above, wherein a deformation amount of a bead around the hole can be easily regulated.

Further objects and advantages of the invention will be apparent from the following description of the invention.

SUMMARY OF THE INVENTION

A metal laminate gasket of the invention is used for an internal combustion engine having a hole to be sealed. The gasket is formed of first and second metal plates laminated together.

The first plate has a main portion extending substantially throughout an entire area of the gasket, a curved portion extending from the main portion to define a first hole corresponding to the hole of the engine, and a flange extending from the curved portion and situated under a part of the main portion. The second metal plate is situated under the main portion and extends substantially throughout the entire area of the gasket. The second metal plate has a second hole in which the curved portion is located, an inner portion situated around the second hole and disposed on the flange, and a recess formed in the inner portion around the second hole to form a thin portion.

In the invention, the gasket includes at least one bead formed on at least one of the first and second metal plates to surround the hole of the engine for sealing. The bead may be formed of a first bead situated on the first metal plate, and a second bead formed on the second metal plate outside the inner portion. The first bead extends toward the flange to be located on the inner portion, and the second bead extends in the same direction as in the first bead and projects downwardly beyond the flange. The first and second beads form surface pressures to seal around the hole of the engine.

In the gasket of the invention, the inner portion of the second metal plate is situated on the flange of the first metal plate, and the recess is formed in the inner portion. In case the thickness of the recess is changed, the surface pressure around the hole can be changed. Thus, in the invention, when the surface pressure around the hole is changed, the thickness of the recess may be changed in addition to the changes of the shape of the beads and the thickness and hardness of the plate for the bead.

The recess formed on the second metal plate may extend from an edge of the second hole and directly abut against the flange. In this case, the total thickness of the first metal plate and the thin portion of the second metal plate is greater than the thickness of the second metal plate outside the thin portion.

The second metal plate may have an edge portion around the second hole such that the recess is formed under the first bead and outside the edge portion relative to the second hole. In this case, the thickness at the edge portion of the second metal plate is made greater than the thickness at the thin portion and less than the thickness of the second metal plate outside the thin portion relative to the second hole. In this structure, the first bead is not completely flattened by the edge portion when the gasket is tightened. When the thickness of the edge portion is adjusted, the surface pressure of the first bead can be regulated.

In the invention, a coating layer may be formed on the second metal plate at a side facing the first metal plate and outside the first bead relative to the hole of the engine. The coating may be formed on other portions of the first and second metal plates.

DETAILED DESCRIPTION OF PREFERRED EMBODIMENTS

Figure 1:
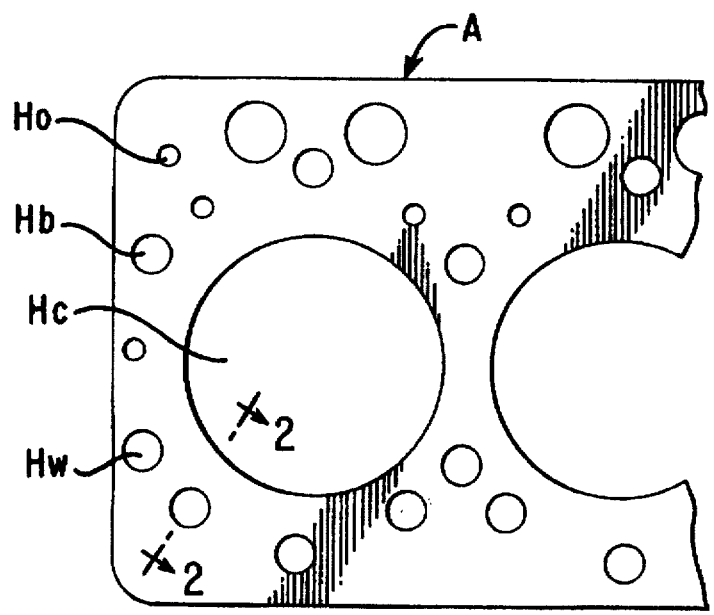
FIG. 1 is a plan view of a part of a first embodiment of a metal laminate gasket of the invention.
Figure 2:
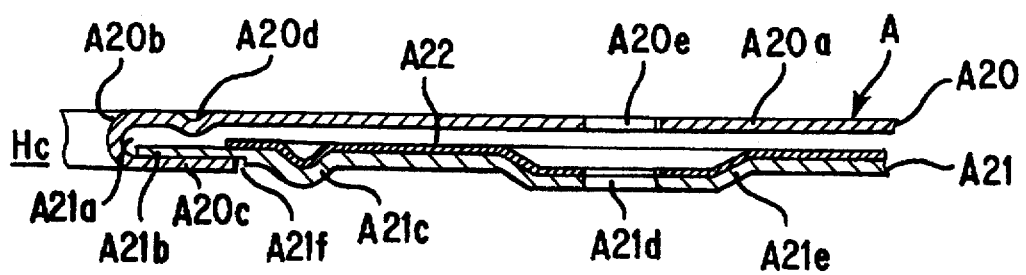
FIG. 2 is an enlarged sectional view taken along line 2—2 in FIG. 1.

With reference to FIGS. 1 and 2, a first embodiment A of a metal laminate gasket of the invention is explained. The gasket A is a cylinder head gasket and includes a plurality of cylinder bores Hc, water holes Hw, oil holes Ho and bolt holes Hb, as in the conventional gasket.

The gasket A is formed of an upper metal plate A20, and a lower metal plate A21. The upper plate A20 includes a main portion A20a extending substantially throughout an entire area of the gasket, a curved portion A20b extending from the main portion A20a and defining the cylinder bore Hc, and a flange A20c extending from the curved portion A20b. The upper plate A20 further includes a bead A20d and a hole A20e for forming the water hole Hw. The bead A20d extends toward the flange A20c and surrounds the cylinder bore Hc to provide a surface pressure when the gasket A is tightened.

The lower plate A21 includes a hole A21a, an inner portion A21b formed around the hole A21a and located on the flange A20c, a bead A21c surrounding the inner portion A21b and extending in the same direction as in the bead A20d, and a hole A21d situated under the hole A20e. A bead or inclined wall A21e is formed around the hole A21d to provide a surface pressure around the water hole Hw when the gasket is tightened. Also, a recess A21f is formed in the inner portion A21b. The recess A21f orients downwardly and abuts against the flange A20c.

When the upper and lower plates A20, A21 are assembled, the bead A21c projects downwardly beyond the flange A20c. The bead A21c is not completely flattened by the flange A20c when the gasket is tightened, so that creep relaxation of the bead A21c is prevented.

The recess A21f extends from the edge of the hole A21a. The thickness of the recess A21f is less than the thickness of the lower plate A21 other than the recess A21f. The total thickness of the upper plate A20 and the recess A21f is greater than the thickness of the lower plate A21 other than the recess A21f. The recess A21f is formed on the lower plate A21 by etching or coining process.

A coating A22 is formed on the lower plate A21 except the inner portion A21b. When the gasket A is tightened, the coating A22 closely contacts the upper plate A20 to thereby prevent fluid from flowing between the upper and lower plates A20, A21. The coating A22 may be formed of or contain fluorine rubber, NBR, silicone rubber or epoxy resin. Since the coating A22 is not formed on the inner portion A21b, there is no coating flow near the cylinder bore Hc. Thus, lowering of the surface pressure by the coating flow under or around the bead A20d is prevented when the gasket is used for a long time.

When the gasket A is situated between a cylinder head and a cylinder block (both not shown) and is tightened, the gasket A is compressed. The bead A20d is substantially completely compressed to provide high surface pressure thereat. The surface pressure at the bead A21c is greater than that of the bead A21e and less than that of the bead A20d.

Since the bead A21c is not completely compressed or flattened by the flange A20c, the surface pressure of the bead A21c is not significantly lowered when the gasket is used for a long time. Thus, even if the surface pressure of the bead A20d is lowered by plastic deformation, the bead A21c can securely seal around the cylinder bore Hc. Also, the bead A21e securely seals around the water hole Hw. Since the coating A22 is formed between the upper and lower plates A20, A21, even if water leaks through the bead A21e, water does not substantially flow between the plates.

In case the bead A20d and the bead A21c are made constant, the thickness of the inner portion A21b or the recess A21f may be changed, so that the surface pressures formed by the beads A20d, A21c can be adjusted. Thus, it is possible to easily adjust or regulate the surface pressure around the cylinder bore Hc. The optimum surface pressure can be formed depending on the structure of the engine.

In addition to the above adjustment, the thickness or hardness of the upper and lower plates A20, A21 may be changed. Therefore, the surface pressure around the holes can be adjusted easily according to the requirement of the gasket.

Figure 3:
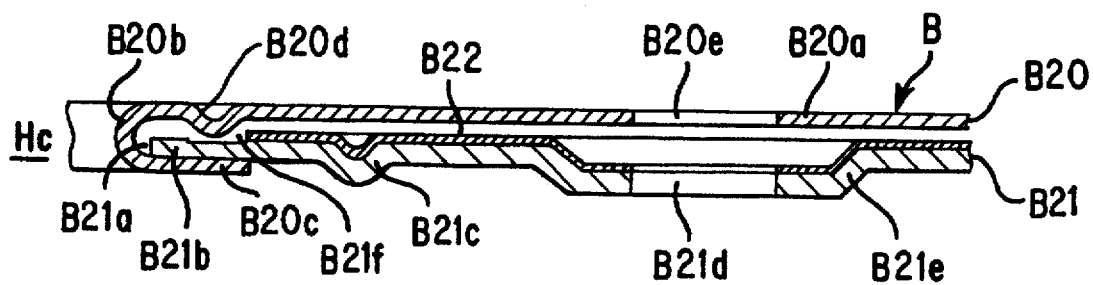
FIG. 3 is a sectional view, similar to FIG. 2, of a second embodiment of a metal laminate gasket of the invention.
Figure 4:
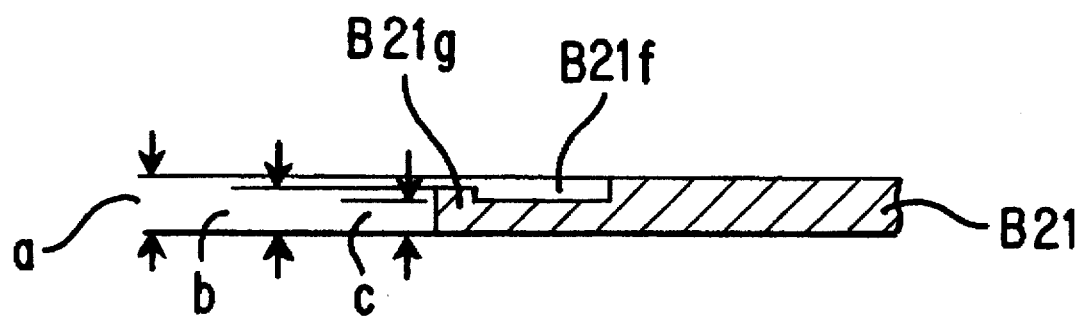
FIG. 4 is an enlarged sectional view of a part of a lower plate of the second embodiment of the metal laminate gasket.
Figure 5:
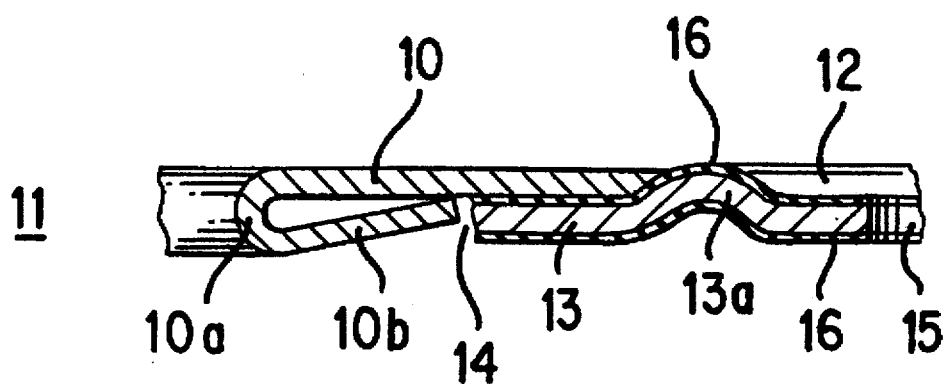
FIG. 5 is a sectional view, similar to FIG. 2, of a conventional metal laminate gasket.

FIGS. 3 and 4 show a second embodiment B of a metal laminate gasket of the invention. The gasket B is formed of an upper metal plate B20, a lower metal plate B21, and a coating B22, as in the gasket A.

The upper plate B20 includes a main portion B20a, a curved portion B20b, a flange B20c, a bead B20d and a hole B20e for forming the water hole Hw, while the lower plate B21 includes a hole B21a, an inner portion B21b located on the flange B20c, a bead B21c, a hole B21d and a bead or inclined wall B21e around the hole B21d, similar to the gasket A. In the gasket B, however, an annular recess B21f is formed in the inner portion B21b, and the bead B20d is located above the annular recess B21f.

As clearly shown in FIG. 4, the lower plate B21 includes an edge portion B21g around the hole B21a. The annular recess B21f is formed around the edge portion B21g. The thickness b at the edge portion B21g is less than the thickness a of the lower plate B21 and greater than the thickness c at the recess B21f. Also, the total thickness at the edge portion B21g (b) and the upper plate B20 (d, not shown) is greater than the thickness a of the lower plate B21.

When the gasket B is tightened between the cylinder block and the cylinder head (both not shown), the beads B20d, B21c, B21e are compressed. The surface pressure at the bead B21c is greater than the surface pressure at the bead B21e and less than the surface pressure at the bead B20d. The edge portion B21g regulates the surface pressure of the bead B20d, and the flange B20c regulates the surface pressure of the bead B21c.

In the gasket B, since the bead B20d is not completely flattened by the edge portion B21g, the surface pressure of the bead B20d is not lowered too much even if the gasket is used for a long time. The beads B20d, B21c securely seal around the cylinder bore, while the bead B21e securely seals around the water hole.

In the gasket B, when the bead B20d and the bead B21c are made constant, the thicknesses of the edge portion B21g and the annular recess B21f may be changed, so that the surface pressure formed by the bead B20d can be adjusted. Thus, it is possible to easily adjust or regulate the surface pressure around the cylinder bore Hc. The optimum surface pressure can be formed depending on the structure of the engine.

While the invention has been explained with reference to the specific embodiments of the invention, the explanation is illustrative, and the invention is limited only by the appended claims.

What is claimed is:

1. A metal laminate gasket for an internal combustion engine having a hole to be sealed, comprising:

a first metal plate having a main potion extending substantially throughout an entire area of the gasket, a curved portion extending from the main portion to define a first hole corresponding to the hole of the engine, and a flange extending from the curved portion and situated under a part of the main portion, a second metal plate situated under the main portion and extending substantially throughout the entire area of the gasket, said second metal plate having a second hole in which said curved portion is located, an inner portion situated around the second hole and disposed on the flange, and a recess formed in the inner portion around the second hole to form a thin portion, and at least one bead formed on at least one of the first and second metal plate to surround the hole of the engine to seal the same, said at least one bead including a first bead formed on the first metal plate and extending toward the flange to be located on the inner portion, and a second bead formed on the second metal plate outside the inner portion and extending in a same direction as in the first bead, said first and second beads forming surface pressures to seal around the hole of the engine.

2. A metal laminate gasket according to claim 1, wherein said first bead is located over the thin portion to adjust the surface pressure formed by the first bead relative to that of the second bead.

3. A metal laminate gasket according to claim 2, wherein said recess on the second metal plate extends from an edge of the second hole and completely abuts against the flange.

4. A metal laminate gasket according to claim 3, wherein a total thickness of the first metal plate and the thin portion of the second metal plate is greater than the thickness of the second metal plate outside the thin portion.

5. A metal laminate gasket according to claim 2, further comprising a coating layer formed on the second metal plate at a side facing the first metal plate and outside the first bead relative to the hole of the engine.

6. A metal laminate gasket according to claim 2, wherein said second metal plate has an edge portion around the second hole, said recess being formed outside the edge portion relative to the second hole and under the first bead.

7. A metal laminate gasket according to claim 6, wherein the thickness at the edge portion of the second metal plate is greater than the thickness at the thin portion and less than the thickness of the second metal plate outside the thin portion relative to the second hole.

8. A metal laminate gasket according to claim 7, wherein a total thickness of the first metal plate and the second metal plate at the edge portion is greater than the thickness of the second metal plate outside the thin portion relative to the second hole.

9. A metal laminate gasket for an internal combustion engine having a hole to be sealed, consisting essentially of first and second metal plates and comprising:

said first metal plate having a main potion extending substantially throughout an entire area of the gasket, a curved portion extending from the main portion to define a first hole corresponding to the hole of the engine, and a flange extending from the curved portion and situated under a part of the main portion, said second metal plate situated under the main portion and extending substantially throughout the entire area of the gasket, said second metal plate having a second hole in which said curved portion is located, an inner portion situated around the second hole and disposed on the flange, and an annular recess formed in the inner portion around the second hole to form a thin portion, said annular recess being located slightly away from the second hole and disposed on the flange, and at least one bead formed on the first metal plate to surround the hole of the engine to seal the same, said at least one bead extending toward the flange and directly facing the annular recess.

10. A metal laminate gasket for an internal combustion engine having a hole to be sealed, consisting essentially of first and second metal plates and comprising:

said first metal plate having a main potion extending substantially throughout an entire area of the gasket, a curved portion extending from the main portion to define a first hole corresponding to the hole of the engine, and a flange extending from the curved portion and situated under a part of the main portion, said second metal plate situated under the main portion and extending substantially throughout the entire area of the gasket, said second metal plate having a second hole in which said curved portion is located, an inner portion situated around the second hole and disposed on the flange, and a recess formed in the inner portion around the second hole to form a thin portion, a total thickness of the thin portion and the first metal plate being greater than the thickness of the second metal plate outside the thin portion, and at least one bead formed on the second metal plate outside the flange to surround the hole of the engine to seal the same, said at least one bead extending in a direction away from the first metal plate.

* * * * *